Patented Sept. 21, 1948

2,449,877

UNITED STATES PATENT OFFICE 2,449,877

PREPARATION OF HYDROXYETHYL-2,5-DICHLOROBENZENE

Thomas S. Carswell, Longmeadow, and Ralph F. Hayes, Springfield, Mass., assignors to Monsanto Chemical Company, St. Louis, Mo., a corporation of Delaware No Drawing. Application December 2, 1943, Serial No. 512,632

10 Claims. (Cl. 260—618)

This invention relates to new organic compounds and a method for preparing the same. More particularly, this invention relates to mono-hydroxy-ethyl-2,5-dichlorobenzenes and to a method for preparing the same.

An object of this invention is the provision of new organic compounds and a method for preparing the same. A particular object of this invention is to provide organic compounds which are valuable intermediates for the production of polymerizable compounds. A further object of this invention is the provision of a process for obtaining these new intermediate organic compounds.

The foregoing objects are accomplished by the following invention which comprises mono-hydroxy-ethyl-2,5-dichlorobenzenes and a method for the preparation of the same.

The preferred process for preparing monohydroxy-ethyl-2,5-dichlorobenzenes according to this invention comprises the following two successive steps or stages involving the preparation of novel intermediates. In the first step, 1-ethyl-2,5-dichlorobenzene is chlorinated in the side chain to produce a mono-chlor-ethyl-2,5-dichlorobenzene. In the second step the chlorine in the side chain of the mono-chlor-ethyl-2,5-dichlorobenzene is replaced by an hydroxyl group by treatment under hydrolyzing conditions to form a mono-hydroxy-ethyl-2,5-dichlorobenzene.

The following is an exemplification of the method outlined above for the preparation of a mono-hydroxy-ethyl-2,5-dichlorobenzene. Where parts are given, they are parts by weight.

I. Preparation of monochlor-ethyl-2,5-dichlorobenzene 100 parts of ethyl-2,5-dichlorobenzene and about 0.5 part of phosphorous trichloride are placed in a reaction vessel equipped with a stirrer and maintained at a temperature of 5–15° C. Chlorine gas is then continuously passed into the ethyl-2,5-dichlorobenzene for about 8 hours while subjecting the mixture to rays from a suitable light source, for example, a Mazda lamp or a General Electric Type S-1 sunlamp. Hydrogen chloride evolved as a result of the reaction is allowed to escape. From the resulting product, 72 parts of alpha-chlor-ethyl-2,5-dichlorobenzene and 12 parts of beta-chlor-ethyl-2,5-dichlorobenzene are separated by fractional distillation. Alpha-chlor-ethyl-2,5-dichlorobenzene and beta-chlor-ethyl-2,5-dichlorobenzene are colorless liquids possessing the following physical properties.

| | Alpha-chlor compound | Beta-chlor compound |
|---|---|---|
| Density, $d_{25}^{25}$ | 1.336 | 1.349 |
| Refractive Index, $n_d^{25}$ | 1.5590 | 1.5630 |
| Boiling Point (at 3 mm. pressure) °C | 87–89 | 96–98 |

These new chemical compounds are described and claimed in our co-pending application Serial No. 512,633, filed simultaneously herewith.

The phosphorous trichloride catalyst in the above example may be replaced by phosphorous pentachloride or may be omitted entirely, although when no catalyst is employed a longer reaction time is required. The amount of phosphorous trichloride or other catalyst may be substantially varied. When desired, the reaction may be carried out at temperatures outside the range given in the above example.

II. Preparation of mono-hydroxy-ethyl-2,5-dichlorobenzene 100 parts of alpha-chlor-ethyl-2,5-dichlorobenzene are mixed with 25 parts of sodium hydroxide and 250 parts of methanol in a reaction vessel equipped with a stirrer. The resulting mixture is boiled under reflux conditions for 8 hours. Thereafter the reaction product is neutralized with hydrochloric acid and freed from sodium chloride by filtration. From the filtrate, 83 parts of alpha-hydroxy-ethyl-2,5-dichlorobenzene are obtained by fractional distillation. This new chemical compound is a colorless liquid having the following physical properties:

Density, $d_{25}^{25}$ ---------------------------- 1.217
Refractive Index, $n_d^{25}$ ----------------- 1.5300
Boiling Point ---------------------------- 102° C. at 12 mm. pressure, 71° C. at 2.5 mm. pressure In place of sodium hydroxide, other hydrolyzing agents may be employed, for example, potassium hydroxide. In place of methanol, other mutual solvents for the reactants may be employed, for example, other lower aliphatic alcohols such as ethanol and propanol.

In a similar manner to that given above, beta-hydroxy-ethyl-2,5-dichlorobenzene may be prepared from beta-chloro-ethyl-2,5-dichlorobenzene or mixtures of alpha- and beta-hydroxy-ethyl-2,5-dichlorobenzene may be prepared from mixtures of the corresponding chlorine derivatives.

Mono-hydroxy-ethyl-2,5-dichlorobenzenes are valuable as intermediates for the synethesis of new organic compounds, for example, they may be dehydrated to form 2,5-dichlorostyrene or they may be esterified to provide esters of ethyl-2,5-dichlorobenzene or the hydroxy-ethyl group may be oxidized to obtain a keto-2,5-dichlorobenzene. The preparation of 2,5-dichlorostyrene is described and claimed in our co-pending application Serial No. 512,634 filed simultaneously herewith.

What is claimed is:

1. A process for preparing alpha-hydroxy-ethyl-2,5-dichlorobenzene which comprises reacting alpha-chlor-ethyl-2,5-dichlorobenzene with caustic alkali while dissolved in a lower aliphatic alcohol.

2. A process for preparing alpha-hydroxy-ethyl-2,5-dichlorobenzene which comprises heating a lower aliphatic alcohol solution containing alpha-chlor-ethyl-2,5-dichlorobenzene and caustic alkali.

3. A process for preparing alpha-hydroxy-ethyl-2,5-dichlorobenzene which comprises forming alpha-chlor-ethyl-2,5-dichlorobenzene by chlorinating ethyl-2,5-dichlorobenzene in the side chain and then heating the alpha-chlor-ethyl-2,5-dichlorobenzene in the presence of caustic alkali while dissolved in a lower aliphatic alcohol.

4. A process for preparing alpha-hydroxy-ethyl-2,5-dichlorobenzene which comprises heating a methanol solution of alpha-chlor-ethyl-2,5-dichlorobenzene in the presence of an excess of caustic alkali on a molar basis.

5. A process for preparing a mono-hydroxy-ethyl-2,5-dichlorobenzene which comprises reacting a mono-chloro-ethyl-2,5-dichlorbenzene with caustic alkali while dissolved in a solution comprising a lower aliphatic alcohol and at a temperature not exceeding the boiling point of the solution.

6. A process as defined in claim 5, in which the alcohol is methanol.

7. A process for preparing alpha-hydroxy-ethyl-2,5-dichlorobenzene which comprises heating a methanol solution of alpha-chlor-ethyl-2,5-dichlorobenzene and caustic alkali.

8. A process as defined in claim 5, which includes the additional steps of neutralizing the reaction product, freeing the neutralized mixture from salts by filtration and then recovering the hydroxy-ethyl-2,5-dichlorobenzene by fractional distillation.

9. A process for preparing a mono-hydroxy-ethyl-2,5-dichlorobenzene which comprises heating a methanol solution containing a mono-chlor-ethyl-2,5-dichlorobenzene and caustic alkali, neutralizing the reaction product with a mineral acid, separating the resulting salt by filtration and then recovering the mono-hydroxy-ethyl-2,5-dichlorobenzene by fractional distillation.

10. A process for preparing alpha-hydroxy-ethyl-2,5-dichlorobenzene which comprises heating a methanol solution containing alpha-chlor-ethyl-2,5-dichlorobenzene and caustic alkali, neutralizing the reaction product with hydrochloric acid, separating the resulting salt by filtration and recovering the alpha-hydroxy-ethyl-2,5-dichlorobenzene by fractional distillation.

THOMAS S. CARSWELL.
RALPH F. HAYES.

REFERENCES CITED

The following references are of record in the file of this patent:

UNITED STATES PATENTS

| Number | Name | Date |
| --- | --- | --- |
| 2,185,141 | Britton et al. | Dec. 26, 1939 |
| 2,290,758 | Levine et al. | July 21, 1942 |
| 2,293,774 | Soday | Aug. 25, 1942 |
| 2,295,077 | Dreisbach et al. | Sept. 8, 1942 |
| 2,363,011 | Michalek et al. | Nov. 21, 1944 |

OTHER REFERENCES

Beilstein, "Handbuch der Organisiden Chemie," Erganzungswerk, vol. VI, page 236.